(12) United States Patent
Liu et al.

(10) Patent No.: US 11,244,142 B2
(45) Date of Patent: Feb. 8, 2022

(54) UNLOCKING METHOD AND MOBILE TERMINAL

(71) Applicant: VIVO MOBILE COMMUNICATION CO., LTD., Chang'an Dongguan (CN)

(72) Inventors: Guohong Liu, Chang'an Dongguan (CN); Xujun Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 26 days.

(21) Appl. No.: 16/606,604

(22) PCT Filed: Apr. 10, 2018

(86) PCT No.: PCT/CN2018/082476
§ 371 (c)(1),
(2) Date: Oct. 18, 2019

(87) PCT Pub. No.: WO2018/192391
PCT Pub. Date: Oct. 25, 2018

(65) Prior Publication Data
US 2020/0042768 A1 Feb. 6, 2020

(30) Foreign Application Priority Data
Apr. 20, 2017 (CN) .......................... 201710260990.6

(51) Int. Cl.
*G06K 9/00* (2006.01)
*G06F 21/32* (2013.01)
(Continued)

(52) U.S. Cl.
CPC ......... *G06K 9/00087* (2013.01); *G06F 3/044* (2013.01); *G06F 21/32* (2013.01);
(Continued)

(58) Field of Classification Search
CPC .. G02F 21/83; G06K 9/0006; G06K 9/00087; G06K 9/0004; G06F 21/32
(Continued)

(56) References Cited

U.S. PATENT DOCUMENTS

| 8,031,046 B2 | 10/2011 | Franza et al. |
| 2015/0146944 A1* | 5/2015 | Pi ............................ G06F 21/83 382/124 |

(Continued)

FOREIGN PATENT DOCUMENTS

| CN | 104391635 A | 3/2015 |
| CN | 105224139 A | 1/2016 |

(Continued)

OTHER PUBLICATIONS

Extended European Search Report related to Application No. 18787565.3 reported on Feb. 21, 2020.
(Continued)

*Primary Examiner* — Abdul-Samad A Adediran
(74) *Attorney, Agent, or Firm* — von Briesen & Roper, s.c.

(57) ABSTRACT

An unlocking method and a mobile terminal are provided. The unlocking method includes: in the case that a mobile terminal is locked, a touch chip determines whether a fingerprint verification operation is detected; in the case that the fingerprint verification operation is detected, the touch chip sends control signals to a central processor and a fingerprint driving chip; the fingerprint driving chip drives, in response to the control signal, a fingerprint sensor to collect fingerprint information, and determines whether the collected fingerprint information matches preset fingerprint information; and if so, the central processor unlocks the mobile terminal in response to a second control signal and a determination result from the fingerprint driving chip.

8 Claims, 5 Drawing Sheets

(51) Int. Cl.
  *G06F 3/044* (2006.01)
  *G06K 9/64* (2006.01)
(52) U.S. Cl.
  CPC ............ *G06K 9/0004* (2013.01); *G06K 9/64* (2013.01); *G06K 2009/0006* (2013.01)
(58) Field of Classification Search
  USPC ........................................................ 382/124
  See application file for complete search history.

(56) References Cited

U.S. PATENT DOCUMENTS

| | | | |
|---|---|---|---|
| 2016/0171281 A1 | 6/2016 | Park et al. | |
| 2017/0024597 A1 | 1/2017 | Cho et al. | |
| 2018/0165507 A1* | 6/2018 | Li | G06K 9/00006 |
| 2018/0224955 A1 | 8/2018 | Chen et al. | |
| 2018/0268121 A1 | 9/2018 | Zhou | |
| 2020/0042768 A1 | 2/2020 | Liu et al. | |

FOREIGN PATENT DOCUMENTS

| | | |
|---|---|---|
| CN | 105550640 A | 5/2016 |
| CN | 105809003 A | 7/2016 |
| CN | 106022073 A | 10/2016 |
| CN | 106055947 A | 10/2016 |
| CN | 106096515 A | 11/2016 |
| CN | 106325479 A | 1/2017 |
| CN | 106331225 A | 1/2017 |
| CN | 106462687 A | 2/2017 |
| CN | 106469014 A | 3/2017 |
| CN | 107422970 A | 12/2017 |
| JP | 2001319234 A | 11/2001 |

OTHER PUBLICATIONS

Tao Feng et al.: "Continuous Remote Mobile Identity Management Using Biometric Integrated Touch-Display", Microarchitecture Workshops (MICROW), 2012 45$^{th}$ Annual.
IEEE/ACM International Symposium, Dec. 1, 2012 (Dec. 1, 2012), pp. 55-62, XP032339574.
International Search Report related to Application No. PCT/CN2018/082476 reported on Jun. 4, 2018.
First CN Office Action related to Application No. 201710260990.6 dated Oct. 9, 2018.
Chinese Search Report related to Application No. 201710260990.6 reported on May 22, 2018.

* cited by examiner

UNLOCKING METHOD AND MOBILE TERMINAL

CROSS-REFERENCE TO RELATED APPLICATION

This patent application is a 35 USC § 371 U.S. national stage of International Application No. PCT/CN2018/082476 filed on Apr. 10, 2018, which claims a priority to. Chinese Patent Application No. 201710260990.6 filed on Apr. 20, 2017, the disclosure of which is incorporated herein in its entirety by reference.

TECHNICAL FIELD

The present disclosure relates to communication technologies, and in particular, relates to an unlocking method and a mobile terminal.

BACKGROUND

A mobile terminal usually has encryption and unlocking functions to better protect information in the mobile terminal. Fingerprint unlocking is a common way of unlocking, which has advantages of high efficiency, simple operation and good security.

In an unlocking mode of the related art, when the mobile terminal is locked, a touch chip usually does not discharge when a screen is locked, and detects a fingerprint verification operation in real time. When the touch chip detects the fingerprint verification operation, the touch chip wakes up a fingerprint driving chip to collect fingerprint information by reporting a fingerprint verification event to a central processor, and verifies the collected fingerprint information. When the verification passes, the mobile terminal is unlocked. Therefore, a process of unlocking the mobile terminal is time-consuming.

SUMMARY

An unlocking method and a mobile terminal are provided in some embodiments of the present disclosure, to solve the time-consuming problem of unlocking the mobile terminal.

In a first aspect, an unlocking method is provided, including:

determining, by a touch chip, whether a fingerprint verification operation is detected in the case that a mobile terminal is locked;

sending, by the touch chip, a first control signal to a fingerprint driving chip and a second control signal to a central processor in the case that the fingerprint verification operation is detected;

driving, by the fingerprint driving chip, in response to the first control signal, a fingerprint sensor to collect fingerprint information of the fingerprint verification operation, and determining whether the collected fingerprint information matches preset fingerprint information; and unlocking the mobile terminal by the central processor in response to the second control signal and a determination result from the fingerprint driving chip in the case that the fingerprint driving chip determines that the collected fingerprint information matches the preset fingerprint information.

In a second aspect, a mobile terminal is provided, including:

a touch chip, configured to determine whether a fingerprint verification operation is detected in the case that the mobile terminal is locked;

the touch chip, further configured to send a first control signal to a fingerprint driving chip and a second control signal to a central processor in the case that the fingerprint verification operation is detected;

the fingerprint driving chip, configured to drive, in response to the first control signal sent by the touch chip, a fingerprint sensor to collect fingerprint information of the fingerprint verification operation, and determine whether the collected fingerprint information matches preset fingerprint information; and the central processor, configured to unlock the mobile terminal in response to the second control signal and a determination result from the fingerprint driving chip in the case that the fingerprint driving chip determines that the collected fingerprint information matches preset fingerprint information.

In the embodiments of the present disclosure, in the case that the mobile terminal is locked, the touch chip determines whether a fingerprint verification operation is detected; in the case that the fingerprint verification operation is detected, the touch chip sends a first control signal to the fingerprint driving chip and sends a second control signal to the central processor; the fingerprint driving chip drives a fingerprint sensor to collect fingerprint information of the fingerprint verification operation in response to the first control signal, and determines whether the collected fingerprint information matches preset fingerprint information; and in the case that the fingerprint driving chip determines that the collected fingerprint information matches the preset fingerprint information, the central processor unlocks the mobile terminal in response to the second control signal and a determination result from the fingerprint driving chip. Therefore, the touch chip may send the control signal to fingerprint driving chip directly, instead of sending the control signal to the fingerprint driving chip through the central processor, thereby shortening time of signal transmission and time of an unlocking process and making the unlocking fast.

BRIEF DESCRIPTION OF THE DRAWINGS

In order to more clearly illustrate the technical solution of the embodiments of the present disclosure, a brief introduction of the accompanying drawings to be used in a description of the embodiments of the present disclosure will be given below. Obviously, the accompanying drawings described below are only some of the embodiments of the present disclosure, and for those ordinary skilled in the art, without creative work, other drawings may also be obtained from these drawings.

DETAILED DESCRIPTION

The technical solutions in the embodiments of the present disclosure will be described hereinafter clearly and completely with reference to the accompanying drawings of the embodiments of the present disclosure. Obviously, the embodiments described above are part of the embodiments of the present disclosure, not all of them. Based on the embodiments of the present disclosure, all other embodiments acquired by those ordinary skilled in the art without creative work will fall into the protection scope of the present disclosure.

Figure 1:
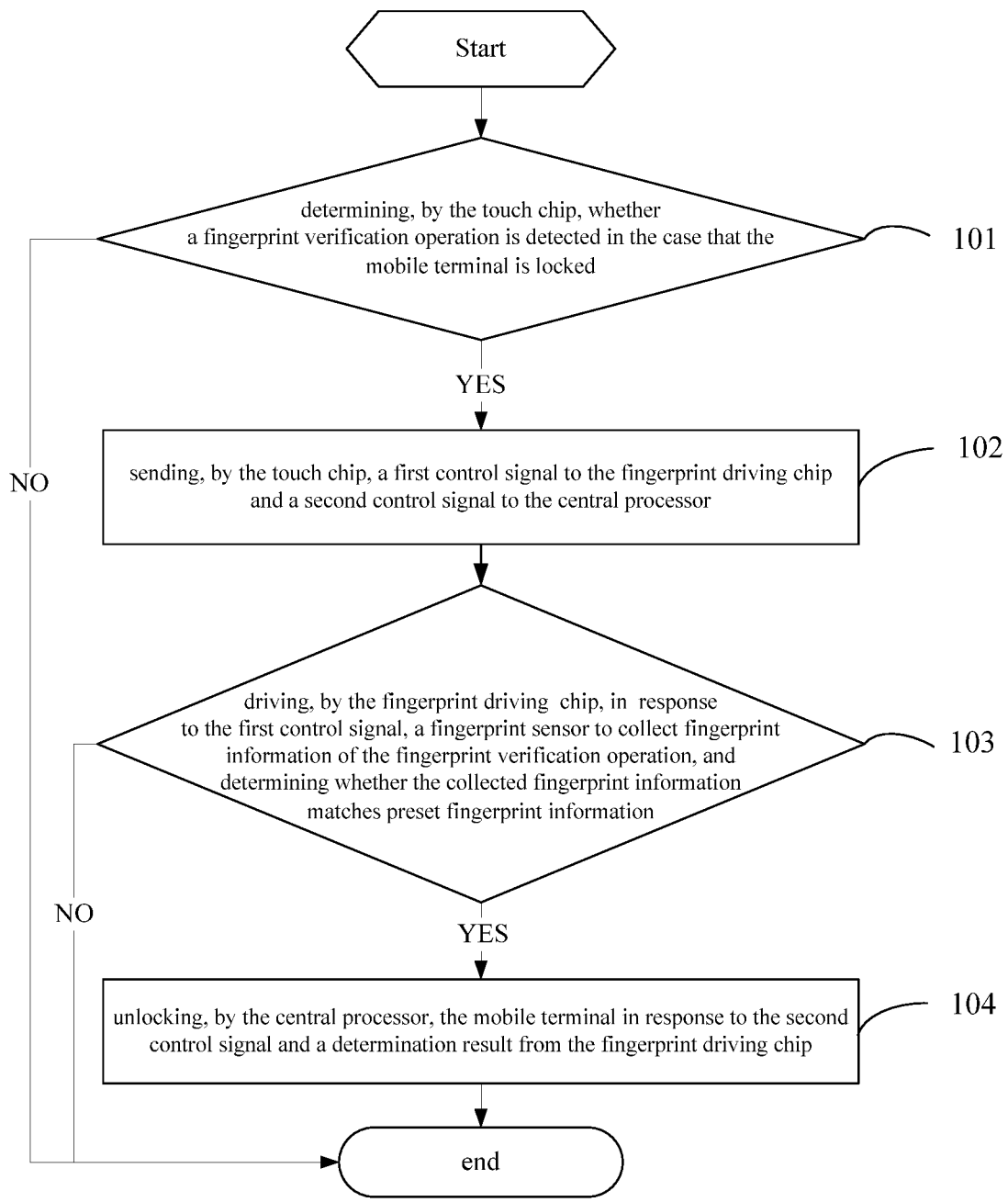
FIG. 1 is a flow chart of an unlocking method in some embodiments of the present disclosure.

Referring to FIG. 1, FIG. 1 is a flow chart of an unlocking method in the embodiments of the present disclosure. The method is applied to a mobile terminal, a touch chip of the mobile terminal is connected to a central processor of the mobile terminal and a fingerprint driving chip of the mobile terminal, the central processor is connected to the fingerprint driving chip, as shown in FIG. 1, the unlocking method includes following steps.

Step 101: determining, by the touch chip, whether a fingerprint verification operation is detected in the case that the mobile terminal is locked, in the case that the fingerprint verification operation is detected, step 102 may be proceeded to.

In the case that the mobile terminal is locked, a screen of the mobile terminal is turned off, while the touch chip does not discharge and detects the fingerprint verification operation on the mobile terminal in real time. The fingerprint verification operation may be a touch operation performed by a user on a fingerprint acquisition region of the mobile terminal to trigger an unlocking of the mobile terminal in the case that the mobile terminal is locked. In the case that the touch chip detects the touch operation on the fingerprint acquisition region of the mobile terminal, it is able to determine whether a fingerprint verification operation is detected by determining whether a characteristic of the touch operation matches that of the fingerprint verification operation. In the case that the touch operation is the fingerprint verification operation, step 102 may be proceeded to. In the case that the touch operation is not the fingerprint verification operation, a process of the method may be ended or the touch operation on the fingerprint acquisition region of the mobile terminal is detected continuously.

Step 102: sending, by the touch chip, a first control signal to the fingerprint driving chip and a second control signal to the central processor.

In the step, the touch chip may communicate with the central processor and the fingerprint driving chip. In the case that the touch chip detects the fingerprint verification operation, the touch chip may send control signals to the central processor and the fingerprint driving chip at the same time, or according to working conditions of the central processor and the fingerprint driving chip, send the control signals to the central processor and the fingerprint driver chips in a preset order. For example, the touch chip may output indicating levels to the central processor and the fingerprint driving chip, or send the control signals in other ways, which is not limited herein.

Thus, instead of sending a control signal to the fingerprint driving chip through the central processor to wake up the fingerprint driving chip, the touch chip may send the control signal to the fingerprint driving chip directly to wake up the fingerprint driving chip, thereby shortening time of signal transmission.

Step 103: driving, by the fingerprint driving chip, in response to the first control signal, a fingerprint sensor to collect4fingerprint information of the fingerprint verification operation, and determining whether the collected fingerprint information matches preset fingerprint information, in the case that the collected fingerprint information matches preset fingerprint information, step 104 may be proceeded to.

After receiving the control signal sent by the touch chip, the fingerprint driving chip may drive the fingerprint sensor to collect the fingerprint information of the fingerprint verification operation. The fingerprint driver chip may store pre-input fingerprint information. The fingerprint sensor may report the collected fingerprint information to the fingerprint driving chip. The fingerprint driving chip may compare the collected fingerprint information with the pre-input fingerprint information to determine whether a characteristic of the collected fingerprint information matches that of the pre-input fingerprint information. In a specific implementation, whether a similarity between the collected fingerprint and the pre-input fingerprint reaches a preset similarity range may be determined according to the characteristics of the fingerprint. In the case that the similarity between the collected fingerprint and the pre-input fingerprint reaches the preset similarity range, the collected fingerprint information matches the pre-input fingerprint information.

Step 104: unlocking, by the central processor, the mobile terminal in response to the second control signal and a determination result from the fingerprint driving chip.

In the step, after receiving the second control signal, the central processor detects a fingerprint verification event. When determining the collected fingerprint information matches preset fingerprint information, the fingerprint driving chip may send signals to the central processor. The central processor may unlock the mobile terminal in response to the received signals, so that a display interface of the mobile terminal may be displayed as a page before being locked or as a main page. Thus, a user may operate the screen of the mobile terminal, such as using the mobile terminal to talk or using applications on the mobile terminal and so on.

In the embodiments of the present disclosure, the unlocking method may be applied to mobile terminals with acquisition components of characteristics of human body, such as a mobile phone, a tablet personal computer, a laptop computer, a personal digital assistant, a mobile internet access device, a wearable device, etc.

According to the unlocking method in the embodiments of the present disclosure, in the case that the mobile terminal is locked, the touch chip determines whether a fingerprint verification operation is detected; in the case that the fingerprint verification operation is detected, the touch chip sends a first control signal to the fingerprint driving chip and sends a second control signal to the central processor; the fingerprint driving chip drives a fingerprint sensor to collect fingerprint information of the fingerprint verification operation in response to the first control signal, and determines whether the collected fingerprint information matches preset fingerprint information; and in the case that the fingerprint driving chip determines that the collected fingerprint information matches the preset fingerprint information, the central processor unlocks the mobile terminal in response to the second control signal and a determination result from the fingerprint driving chip. Therefore, the touch chip may send the control signal to fingerprint driving chip directly, instead of sending the control signal to the fingerprint driving chip through the central processor, thereby shortening time of signal transmission and time of an unlocking process and making the unlocking fast.

Figure 2:
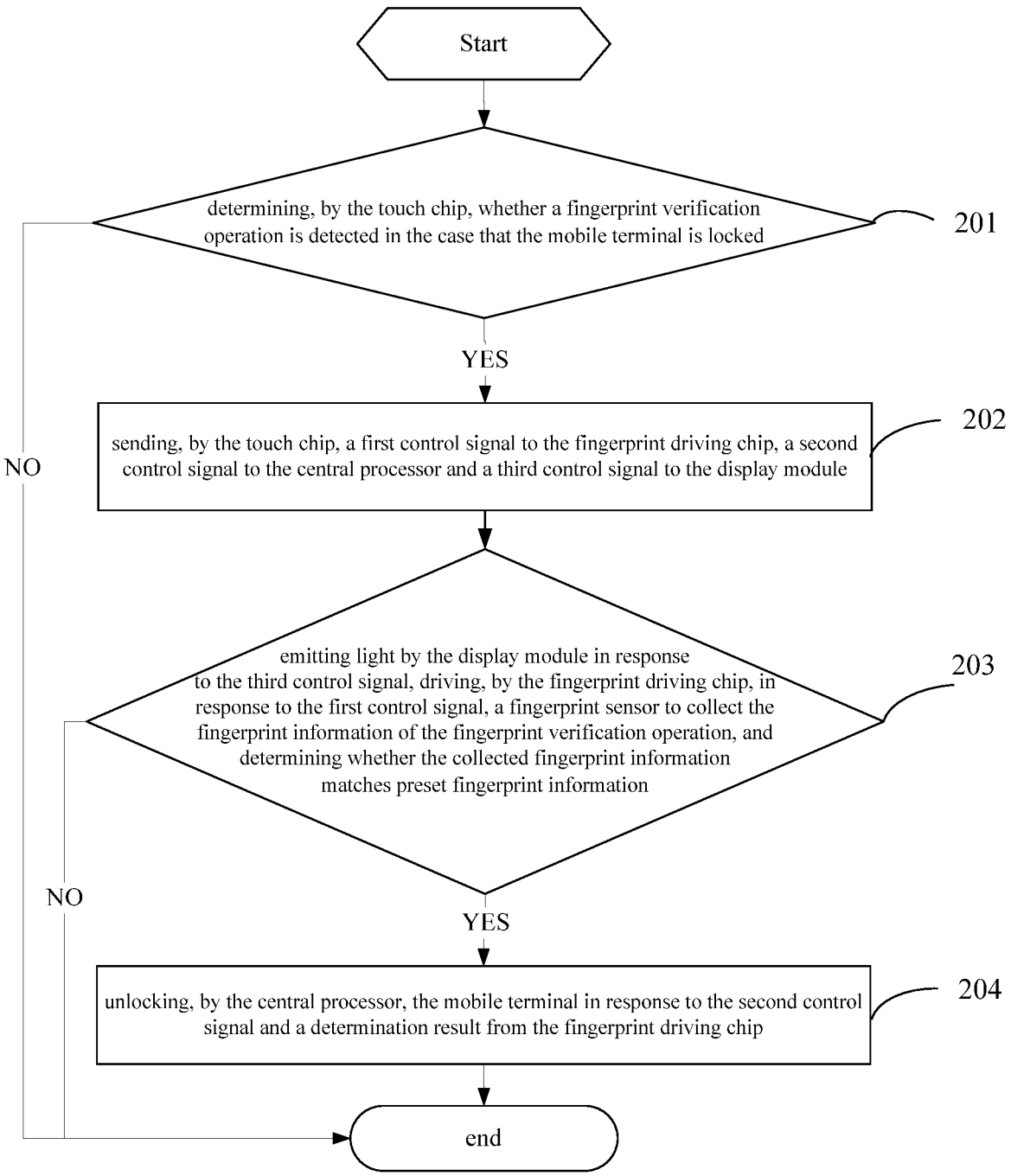
FIG. 2 is a flow chart of another unlocking method in some embodiments of the present disclosure.

Referring to FIG. 2 which is a flow chart of an unlocking method in some embodiments of the present disclosure, the method is applied to a mobile terminal, a touch chip of the mobile terminal is connected to a central processor of the mobile terminal and a fingerprint driving chip of the mobile terminal, the central processor is connected to the fingerprint driving chip and a display module respectively. A main difference between the embodiment in FIG. 2 and the embodiment in FIG. 1 is that the touch chip sends a control signal to the display module while sending the control signals to the fingerprint driving chip and the central processor. As shown in FIG. 2, the unlocking method includes following steps.

Step 201: determining, by the touch chip, whether a fingerprint verification operation is detected in the case that the mobile terminal is locked, in the case that the fingerprint verification operation is detected, step 202 may be proceeded to.

In the step, the touch chip detects a touch operation of a user on the mobile terminal, obtains a touch parameter of the touch operation, determines whether the touch parameter matches a preset touch parameter, and determine that the touch parameter is the fingerprint verification operation in the case that the touch parameter of the touch operation matches the preset touch parameter. The touch parameter includes one or any combination of following parameters: a touch area, a touch pressure and a touch duration.

In the case that the mobile terminal is locked, a screen of the mobile terminal is turned off, while the touch chip does not discharge, and detects the fingerprint verification operation on the mobile terminal in real time. The fingerprint verification operation may be a touch operation performed by a user on the mobile terminal to perform fingerprint verification.

Specifically, the touch chip may detect the touch operation on the mobile terminal, obtain the touch parameter of the touch operation including the touch area, the touch pressure, the touch duration, etc., and compare the obtained touch parameter with a pre-stored touch parameter of the touch operation. In the case that the obtained touch parameter is within a preset deviation range relative to the pre-stored touch parameter, then that the obtained touch parameter is the fingerprint verification operation is determined. For example, the pre-stored touch parameters are a touch area a and a touch pressure b. The obtained touch area is 90% of the pre-stored area a, and the obtained touch pressure is 90% of the pre-stored pressure b. If the deviations described above are within a preset deviation range, then that the obtained touch parameter is the fingerprint verification operation is determined.

In the case that the touch operation is not the fingerprint verification operation, then a process of the method may be ended or the touch operation on the fingerprint verification operation of the mobile terminal is detected continuously.

Step202: sending, by the touch chip, a first control signal to the fingerprint driving chip, a second control signal to the central processor and a third control signal to the display module in the case that the fingerprint verification operation is detected.

In this step, the first control signal, the second control signal and the third control signal are indicating levels.

In this step, the touch chip may communicate with the central processor, the fingerprint driving chip and the display module. In the case that the touch chip detects the fingerprint verification operation, the touch chip may send the control signals to the central processor, the fingerprint driving chip and the display module at the same time. The touch chip may also send the control signal to the display module while sending the control signals to the central processor and the fingerprint driving chip. In some embodiments, the touch chip may output the indicating levels to the central processor, the fingerprint driving chip and the display module. For example, the touch chip may output high levels or low levels to the central processor, the fingerprint driving chip and the display module to wake up the fingerprint driving chip and the display module to work.

In the embodiment, the touch chip may directly send the indicating levels to the fingerprint driving chip and the display module to wake up the fingerprint driving chip, the central processor and the display module to work, thereby shortening time of signal transmission and improving unlocking efficiency.

Step203: emitting light by the display module in response to the third control signal, to enable the fingerprint sensor to collect the fingerprint information of the fingerprint verification operation in an illumination environment, driving, by the fingerprint driving chip, in response to the first control signal, a fingerprint sensor to collect the fingerprint information of the fingerprint verification operation, and determining whether the collected fingerprint information matches preset fingerprint information. In the case that the collected fingerprint information matches preset fingerprint information, step 204 may be proceeded to.

In the embodiment, after receiving the third control signal sent by the touch chip, the display module may emit pulsed intense light, so that when the fingerprint information is collected through the screen of the mobile terminal, "bright environment" may be provided for an optical fingerprint sensor to read the fingerprint information. After receiving the first control signal sent by the touch chip, the fingerprint driving chip may drive the fingerprint sensor to collect the fingerprint information. The fingerprint sensor may be integrated into the display screen, and fingerprint may be collected through a display module glass by using a principle of pinhole imaging.

The fingerprint driver chip may store pre-input fingerprint information. The fingerprint sensor may report the collected fingerprint information to the fingerprint driving chip. The fingerprint driving chip may compare the collected fingerprint information with the pre-input fingerprint information to determine whether a characteristic of the collected fingerprint information matches that of the pre-input fingerprint information. In some embodiments, whether a similarity between the collected fingerprint and the pre-input fingerprint reaches a preset similarity range may be determined according to the characteristics of the fingerprint. In the case that the similarity between the collected fingerprint and the pre-input fingerprint reaches the preset similarity range, the collected fingerprint information matches the pre-input fingerprint information.

Step 204: unlocking, by the central processor, the mobile terminal in response to the second control signal and a determination result from the fingerprint driving chip.

In the step, after receiving the second control signal, the central processor detects a fingerprint verification event. When the fingerprint driving chip determines that the collected fingerprint information matches the preset fingerprint information, the fingerprint driving chip may send signals to the central processor. The central processor may unlock the mobile terminal in response to the received signals, so that a display interface of the mobile terminal may be displayed as a page before being locked or as a main page. Thus, a user may operate the screen of the mobile terminal, such as using the mobile terminal to talk or using applications on the mobile terminal and so on.

According to the unlocking method in the embodiments of the present disclosure, the touch chip may send the control signals to the fingerprint driving chip, the central processor and the display module, the display module may emit light according to the control signals, the fingerprint driving chip may drive the fingerprint sensor to collect fingerprint information in response to the control signals, then unlocking is performed according to the collected fingerprint information. Thus, when the fingerprint information is collected on the screen of the mobile terminal, the touch chip may wake up the fingerprint driving chip and the display module to work, thereby reducing transiting time of the central processor, improving response speed, shortening time of an unlocking process and making the unlocking fast.

Figure 3:
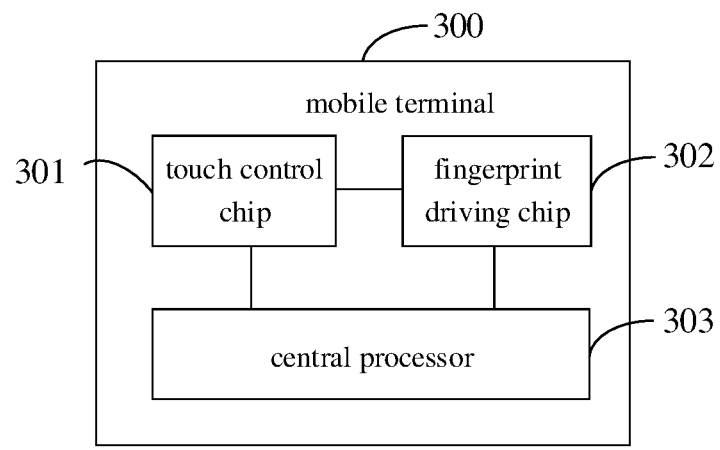
FIG. 3 is a first schematic view of a mobile terminal in some embodiments of the present disclosure.

Referring to FIG. 3, FIG. 3 is a schematic view of a mobile terminal in the embodiments of the present disclosure. As shown in FIG. 3, a mobile terminal 300 includes a touch chip 301, a fingerprint driving chip 302, a central processor 303, the touch chip 301 is connected to the fingerprint driving chip 302, the touch chip 301 is connected to the central processor 303, the central processor 303 is connected to the fingerprint driving chip 302.

The touch chip 301 is configured to determine whether a fingerprint verification operation is detected in the case that the mobile terminal is locked.

The touch chip 301 is further configured to send a first control signal to the fingerprint driving chip and a second control signal to the central processor in the case that the fingerprint verification operation is detected.

The fingerprint driving chip 302 is configured to drive, in response to the first control signal sent by the touch chip, a fingerprint sensor to collect fingerprint information of the fingerprint verification operation, and determine whether the collected fingerprint information matches preset fingerprint information.

The central processor 303 is configured to unlock the mobile terminal in response to the second control signal and a determination result from the fingerprint driving chip in the case that the fingerprint driving chip determines that the collected fingerprint information matches preset fingerprint information.

Figure 4:
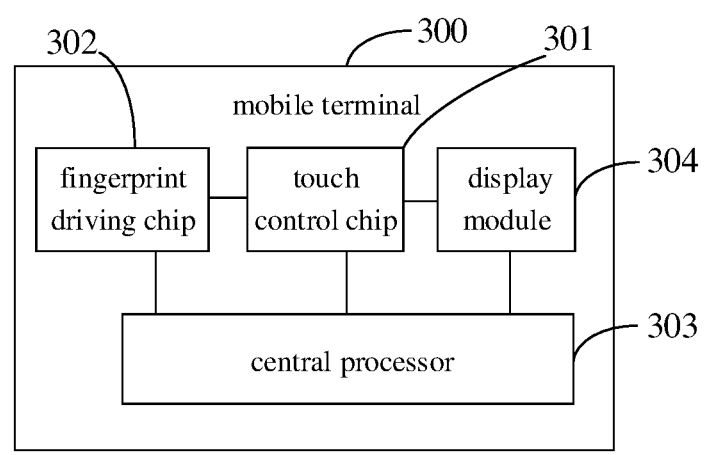
FIG. 4 is a second schematic view of a mobile terminal in some embodiments of the present disclosure.

Optionally, as shown in FIG. 4, the touch chip 301 is connected to a display module 304 of the mobile terminal 300, the central processor 303 is connected to the display module 304, the mobile terminal 300 includes:

the touch chip 301, further configured to send a third control signal to the display module; and the display module 304, configured to emit light in response to the third control signal sent by the touch chip 301, to enable the fingerprint sensor to collect the fingerprint information of the fingerprint verification operation in an illumination environment.

Optionally, the first control signal, the second control signal and the third control signal are indicating levels.

Figure 5:
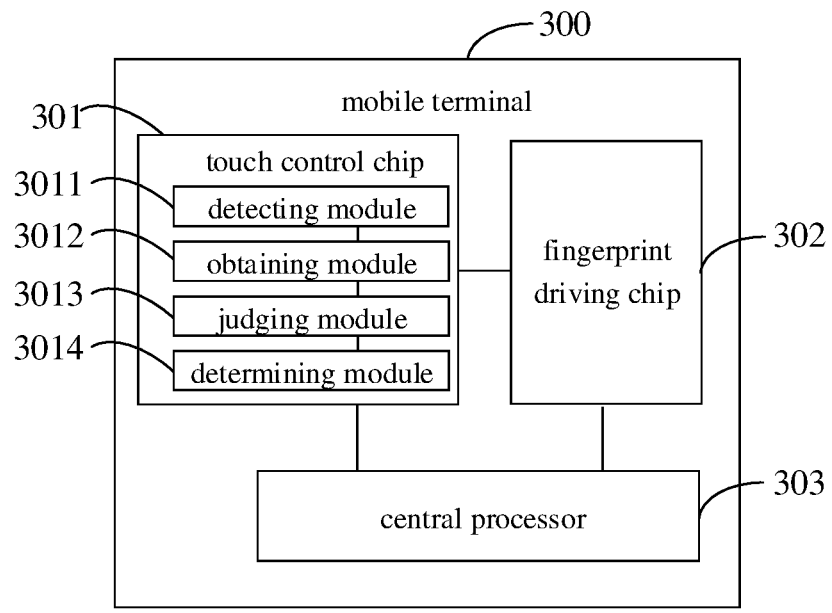
FIG. 5 is a third schematic view of a mobile terminal in some embodiments of the present disclosure.

Optionally, as shown in FIG. 5, the touch chip 301 includes:

a detecting module 3011, configured to detect a touch operation of a user on the mobile terminal;

an obtaining module 3012, configured to obtain a touch parameter of the touch operation detected by the detecting module 3011;

a judging module 3013, configured to determine whether the touch parameter obtained by the obtaining module 3012 matches a preset touch parameter; and a determining module 3014, configured to determine the touch operation is the fingerprint verification operation in the case that the judging module 3013 determines that the touch parameter of the touch operation matches the preset touch parameter.

Optionally, the touch parameter comprises one or any combination of following parameters:

a touch area, a touch pressure and a touch duration.

The mobile terminal 300 may implement various processes of the mobile terminal implemented in the method embodiments of FIG. 1-FIG. 2, which will not be repeated here for the sake of simplicity.

According to the mobile terminal 300 in the embodiments of the present disclosure, in the case that the mobile terminal is locked, the touch chip determines whether a fingerprint verification operation is detected; in the case that the fingerprint verification operation is detected, the touch chip sends a first control signal to the fingerprint driving chip and sends a second control signal to the central processor; the fingerprint driving chip drives a fingerprint sensor to collect fingerprint information of the fingerprint verification operation in response to the first control signal, and determines whether the collected fingerprint information matches preset fingerprint information; and in the case that the fingerprint driving chip determines that the collected fingerprint information matches preset fingerprint information, the central processor unlocks the mobile terminal in response to the second control signal and a determination result from the fingerprint driving chip. Therefore, the touch chip may send the control signal to fingerprint driving chip directly, instead of sending the control signal to the fingerprint driving chip through the central processor, thereby shortening time of signal transmission and time of an unlocking process and making the unlocking fast.

Figure 6:
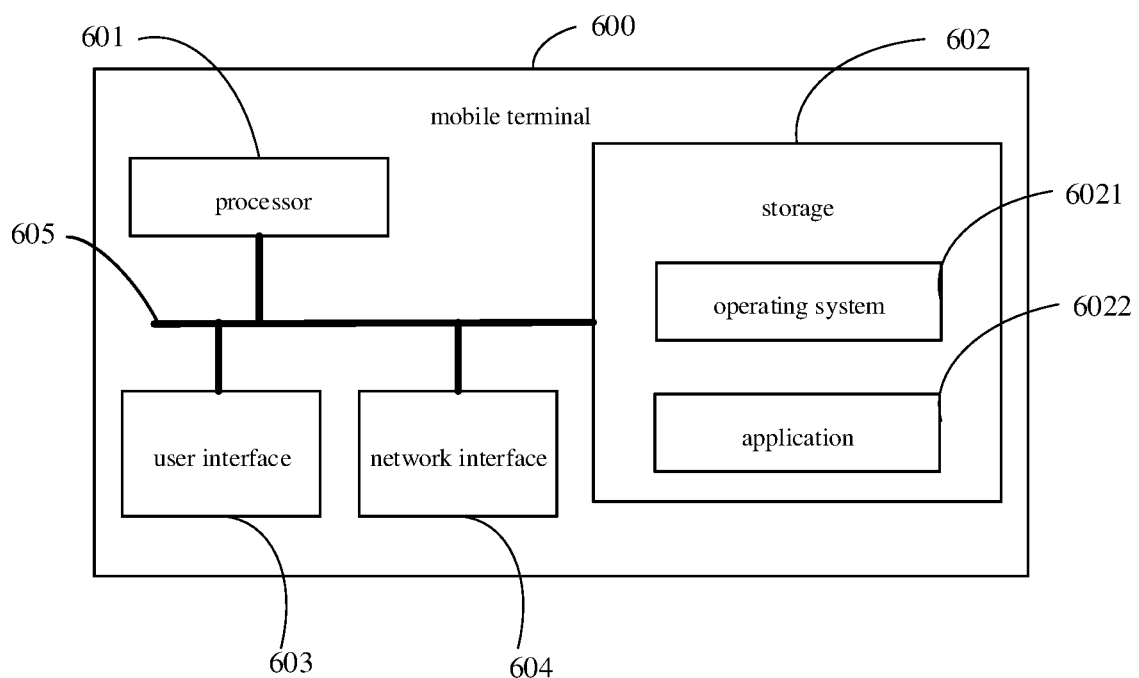
FIG. 6 is a fourth schematic view of a mobile terminal in some embodiments of the present disclosure.

Referring to FIG. 6, FIG. 6 is a schematic view of a structure of a mobile terminal in the embodiments of the present disclosure. As shown in FIG. 6, a mobile terminal 600 includes: at least one processor 601, a storage 602, at least one network interface 604 and a user interface 603. Each component of the mobile terminal 600 is coupled together through a bus system 605. It is understandable that, the bus system 605 is to realize connection communication between these components. The bus system 605 includes not only a data bus, but also a power bus, a control bus and a state signal bus. But for the sake of clarity, in FIG. 6, all kinds of buses are marked as the bus system 605. The mobile terminal 600 also includes an acquisition component 606 of characteristics of human body. The acquisition component 606 of characteristics of human body is connected to each component of the mobile terminal through the bus system 605.

The user interface 603 may include a display, a keyboard, or a click device (e.g., a mouse, a track ball, a touch pad, a touch screen, etc.).

It is understandable that, the storage 602 in the embodiments of the present disclosure may be a transitory storage or a non-transitory storage, or include both of the transitory storage and the non-transitory storage. The non-transitory storage may be a Read-Only Memory (ROM), a Programmable Read-Only Memory (PROM), an Erasable Programmable Read-Only Memory (EPROM), an Electrically Erasable Programmable Read-Only Memory (EEPROM), or a flash. The transitory storage may be a Random Access Memory (RAM), which serves as an external cache. Various RAM are available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), Enhanced Synchronous Dynamic Random Access Memory (ESDRAM), Synch Link Dynamic Random Access Memory (SLDRAM) and Direct Rambus Random Access Memory (DRRAM), which is illustrated by examples, not in a restricting way. The storage 602 of the systems and methods described in the present disclosure is intended to include, but is not limited to, the storage described above and any other suitable types of storages.

In some embodiments, the storage 602 stores following elements, executable modules or data structures, or their subsets, or their extensions: an operating system 6021 and an application 6022.

The operating system 6021 includes various system programs, such as a framework layer, a core library layer, a driver layer, etc., used for implementing various basic services and dealing with hardware-based tasks. The application 6022 includes various applications, such as a media player, a browser, etc., used for implementing various application services. A program implementing the method of the embodiments of the present disclosure may be included in the application 6022.

In the embodiments of the present disclosure, by calling programs or instructions stored in the storage 602, in particular, programs or instructions stored in the application 6022, and the processor 601 is configured to:

control the touch chip to determine whether a fingerprint verification operation is detected in the case that the mobile terminal is locked;

control the touch chip to send a first control signal to the fingerprint driving chip and a second control signal to the central processor in the case that the fingerprint verification operation is detected;

control the fingerprint driving chip to drive, in response to the first control signal, a fingerprint sensor to collect fingerprint information of the fingerprint verification operation, and determine whether the collected fingerprint information matches preset fingerprint information; and unlock the mobile terminal in response to the second control signal and a determination result from the fingerprint driving chip in the case that the fingerprint driving chip determines that the collected fingerprint information matches the preset fingerprint information.

The methods disclosed in the above-mentioned embodiments of the present disclosure may be applied to or implemented by the processor 601. The processor 601 may be an integrated circuit chip capable of processing signals. In an implementation, the steps of the above method may be accomplished by an integrated logic circuit in a form of hardware in the processor 601 or instructions in a form of software. The processor 601 may be a general processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps and logical block diagrams in the embodiments of the present disclosure may be implemented or executed. The general processor may be a microprocessor or any conventional processor. The steps of the method in the embodiments of the present disclosure may be directly embodied in the execution of a hardware decoding processor or in combination of hardware and software modules in the decoding processor. The software modules may be located in a RAM, a flash, a read-only memory, a programmable read-only memory or an electrical erasable programmable memory, a register and other mature storage media in the art. The storage medium may be located in the storage 602, and the processor 601 reads information in the storage 602, and completes the steps of the above methods with the hardware in the processor 601.

It is understandable that, the embodiments described above may be implemented with hardware, software, firmware, middleware, microcode or a combination thereof. For a hardware implementation, a processing unit may be implemented in one or more Application Specific Integrated Circuits (ASIC), Digital Signal Processors (DSP), Digital Signal Processing Devices (DSPD), Programmable Logic Devices (PLD), Field-Programmable Gate Arrays (FPGA), general processors, controllers, microcontrollers, microprocessors, other electronic units or combinations thereof for performing the functions described in the application.

For a software implementation, the techniques described in the present disclosure may be implemented by modules (such as processes, functions, etc.) performing the functions described in the present disclosure. Software code may be stored in the storage and executed by the processor. The storage may be implemented in or outside the processor.

Optionally, the processor 601 is further configured to:

control the touch chip to send a third control signal to the display module;

control the display module to emit light in response to the third control signal, to enable the fingerprint sensor to collect the fingerprint information of the fingerprint verification operation in an illumination environment.

Optionally, the first control signal, the second control signal and the third control signal are indicating levels.

Optionally, the processor 601 is further configured to:

control the touch chip to detect a touch operation of a user on the mobile terminal;

obtain a touch parameter of the touch operation;

determine whether the touch parameter matches a preset touch parameter, and determine the touch parameter is the fingerprint verification operation in the case that the touch parameter of the touch operation matches the preset touch parameter.

Optionally, the touch parameter comprises one or any combination of following parameters:

a touch area, a touch pressure and a touch duration.

The mobile terminal 600 may implement various processes of the mobile terminal implemented in the embodiments described above, which will not be repeated here for the sake of simplicity.

According to the mobile terminal 600 in the embodiments of the present disclosure, in the case that the mobile terminal is locked, the touch chip determines whether a fingerprint verification operation is detected; in the case that the fingerprint verification operation is detected, the touch chip sends a first control signal to the fingerprint driving chip and sends a second control signal to the central processor; the fingerprint driving chip drives a fingerprint sensor to collect fingerprint information of the fingerprint verification operation in response to the first control signal, and determines whether the collected fingerprint information matches preset fingerprint information; and in the case that the fingerprint driving chip determines that the collected fingerprint information matches preset fingerprint information, the central processor unlocks the mobile terminal in response to the second control signal and a determination result from the fingerprint driving chip. Therefore, the touch chip may send the control signal to fingerprint driving chip directly, instead of sending the control signal to the fingerprint driving chip through the central processor, thereby shortening time of signal transmission and time of an unlocking process and making the unlocking fast.

Figure 7:
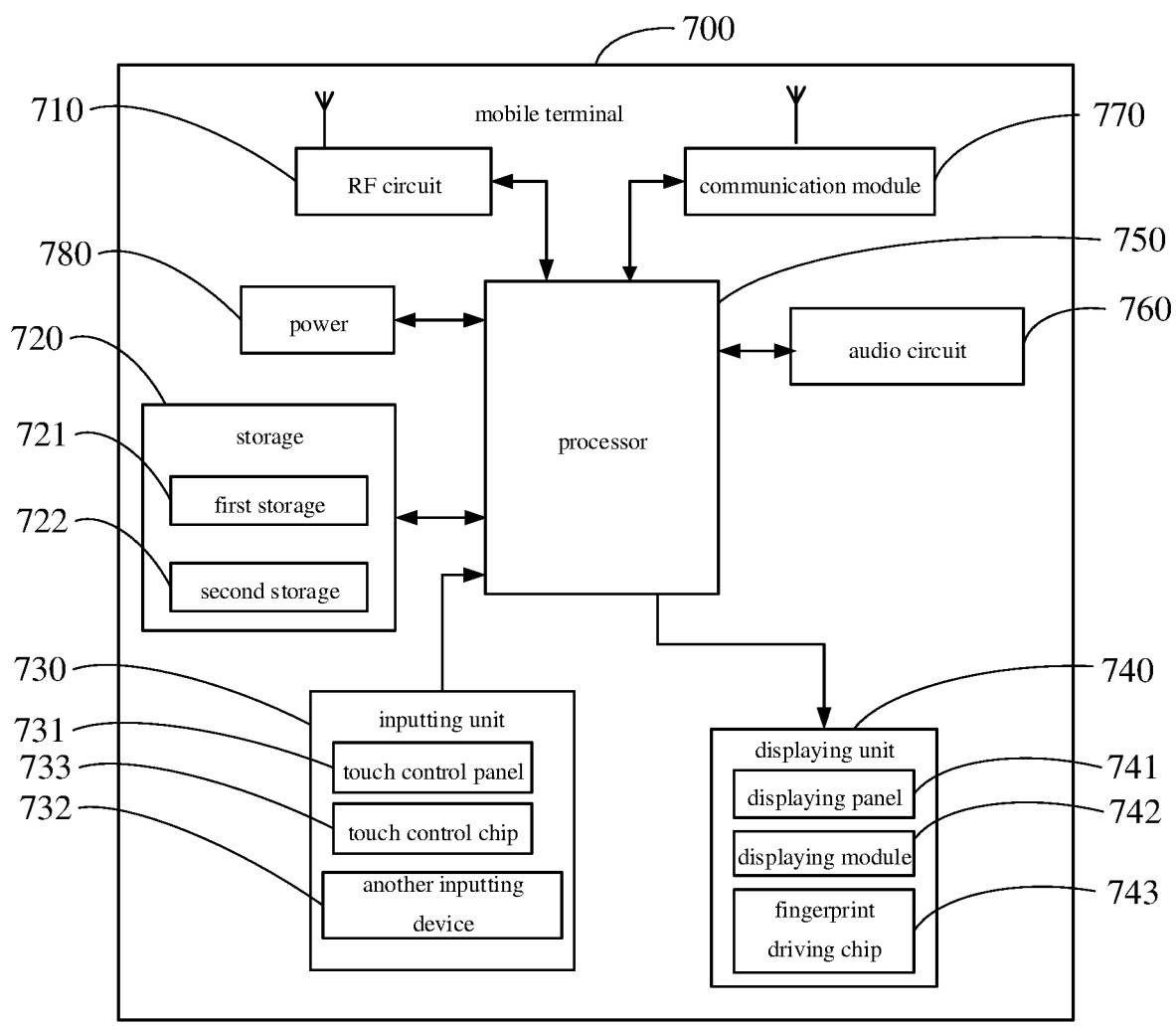
FIG. 7 is a fifth schematic view of a mobile terminal in some embodiments of the present disclosure.

Referring to FIG. 7, FIG. 7 is a schematic view of a structure of a mobile terminal in the embodiments of the present disclosure. As shown in FIG. 7, a mobile terminal 700 includes a Radio Frequency (RF) circuit 710, a storage 720, an inputting unit 730, a displaying unit 740, a processor 750, an audio circuit 760, a communication module 770 and a power 780.

The inputting unit 730 may receive inputted numeral or character information, and generate signal input related with user configuration and function control of the mobile terminal 700. Specifically, in the embodiments of the present disclosure, the inputting unit 730 may include a touch panel 731. The touch panel 731 is also called a touch screen, and may collect a touch operation performed by a user on or near the touch panel 731 (e.g., the user performs an operation on or near the touch panel 731 with any suitable object or accessory such as a finger and a touchpen), and drive a connection device according to a preset program. Optionally, the touch panel 731 may include a touch detecting device and a touch controller. The touch detecting device may detect a touch position of the user, detect a signal generated based on the touch operation, and transmit the signal to the touch controller. The touch controller may receive touch information from the touch detecting device, convert the touch information into a touch point coordinate, transmit the touch point coordinate to the processor 750, and receive and execute a command sent by the processor 750. In addition, the touch panel 731 may be implemented by multiple modes such as a resistive mode, a capacitive mode, an infrared mode or a surface acoustic wave mode. Besides the touch panel 731, the inputting unit 730 may further include another inputting device 732. The inputting device 732 may include, but is not limited to, at least one of a physical keyboard, a function key (such as a volume control key, a switch key etc.), a trackball, a mouse and an operating lever. A touch chip 733 may be located on the inputting unit 730 or a motherboard.

The displaying unit 740 may display information inputted by the user or information provided to the user and various menu interfaces of the mobile terminal 700. The displaying unit 740 may include a displaying panel 741, which may be configured by a Liquid Crystal Display (LCD) and an Organic Light-Emitting Diode (OLED).

A display module 742 in the embodiments of the present disclosure may be located in the displaying unit 740, a fingerprint driving chip 743 may be located on the display module 742 or the motherboard, a fingerprint sensor may be located below the display module 742, and the fingerprint driving chip 743 may drive the fingerprint sensor to collect fingerprint information, which is only an example shown in FIG. 7. The touch chip 733 communicates with the processor 750, the fingerprint driving chip 743 and the display module 742 respectively, and the processor 750 communicates with the fingerprint driving chip 743 and the display module 742 respectively.

It should be noted that the touch panel 731 may cover the display panel 741 to form a touch display screen. In the case that the touch display screen detects a touch operation on or near the touch display screen, the touch operation is transmitted to the processor 750 to determine a type of a touch event, and then the processor 750 provides a corresponding visual output on the touch display screen according to the type of the touch event.

The touch display screen includes an application interface display region and a common controls display region. The application interface display region and the common controls display region may be arranged in an unrestricted manner, such as an upper and lower alignment, a left and right alignment, or other alignments distinguishing the two display regions. The application interface display region may display an interface of the application. Each interface may include at least one application icon and/or interface elements such as a widget desktop control. The application interface display region may also be an empty interface without any content. The common controls display region may display a control with a high usage rate, such as a setting button, an interface number, a scroll bar, a telephone icon and other application icons. The touch screen in the embodiments of the present disclosure is a flexible screen, and both sides of the flexible screen are coated with an organic transparent conductive film of carbon nanotubes.

The processor 750 is a control center of the mobile terminal 700. The processor 750 connects all parts of a mobile phone by various interfaces and lines. The processor 750 performs various functions and processes of the mobile terminal 700 by running or executing software programs and/or modules stored in a first storage 721 and calling data stored in a second storage 722, so as to monitor the mobile terminal 700 as a whole. Optionally, the processor 750 may include one or more processing units.

In the embodiments of the present disclosure, by calling the software programs and/or the modules stored in the first storage 721 and/or the data in the second storage 722, the processor 750 is configured to: control the touch chip to determine whether a fingerprint verification operation is detected in the case that the mobile terminal is locked; control the touch chip to send a first control signal to the fingerprint driving chip and a second control signal to the central processor in the case that the fingerprint verification operation is detected; control the fingerprint driving chip to drive, in response to the first control signal, a fingerprint sensor to collect fingerprint information of the fingerprint verification operation, and determine whether the collected fingerprint information matches preset fingerprint information; and unlock the mobile terminal in response to the second control signal and a determination result from the fingerprint driving chip in the case that the fingerprint driving chip determines that the collected fingerprint information matches the preset fingerprint information.

Optionally, the touch chip is connected to a display module of the mobile terminal, the processor 750 is further configured to: while the touch chip sends control signals to the central processor and the fingerprint driving chip, control the touch chip to send a third control signal to the display module;

control the display module to emit light in response to the third control signal, to enable the fingerprint sensor to collect the fingerprint information of the fingerprint verification operation in an illumination environment.

Optionally, the first control signal, the second control signal and the third control signal are indicating levels.

Optionally, the processor 750 is further configured to:

control the touch chip to detect a touch operation of a user on the mobile terminal;

obtain a touch parameter of the touch operation;

determine whether the touch parameter matches a preset touch parameter, and determine the touch parameter is the fingerprint verification operation in the case that the touch parameter of the touch operation matches the preset touch parameter.

Optionally, the touch parameter comprises one or any combination of following parameters:

a touch area, a touch pressure and a touch duration.

The mobile terminal 700 may implement various processes of the mobile terminal implemented in the embodiments described above, which will not be repeated here for the sake of simplicity.

According to the mobile terminal 800 in the embodiments of the present disclosure, in the case that the mobile terminal is locked, the touch chip determines whether a fingerprint verification operation is detected; in the case that the fingerprint verification operation is detected, the touch chip sends a first control signal to the fingerprint driving chip and sends a second control signal to the central processor; the fingerprint driving chip drives a fingerprint sensor to collect fingerprint information of the fingerprint verification operation in response to the first control signal, and determines whether the collected fingerprint information matches preset fingerprint information; and in the case that the fingerprint driving chip determines that the collected fingerprint information matches preset fingerprint information, the central processor unlocks the mobile terminal in response to the second control signal and a determination result from the fingerprint driving chip. Therefore, the touch chip may send the control signal to fingerprint driving chip directly, instead of sending the control signal to the fingerprint driving chip through the central processor, thereby shortening time of signal transmission and time of an unlocking process and making the unlocking fast.

The embodiments of the present disclosure also provide a computer readable storage medium storing computer programs (instructions), in the case that the programs (instructions) are executed by a processor, following steps are performed:

determining, by the touch chip, whether a fingerprint verification operation is detected in the case that the mobile terminal is locked;

sending, by the touch chip, a first control signal to the fingerprint driving chip and a second control signal to the central processor in the case that the fingerprint verification operation is detected;

driving, by the fingerprint driving chip, in response to the first control signal, a fingerprint sensor to collect fingerprint information of the fingerprint verification operation, and determining whether the collected fingerprint information matches preset fingerprint information; and unlocking, by the central processor, the mobile terminal in response to the second control signal and a determination result from the fingerprint driving chip in the case that the fingerprint driving chip determines that the collected fingerprint information matches preset fingerprint information.

Optionally, the touch chip is connected to a display module of the mobile terminal, the central processor is connected to the display module, the method further including:

while sending, by the touch chip, the first control signal to the fingerprint driving chip and the second control signal to the central processor, sending, by the touch chip, a third control signal to the display module; and emitting, by the display module, light in response to the third control signal, to enable the fingerprint sensor to collect the fingerprint information of the fingerprint verification operation in an illumination environment.

Optionally, the first control signal, the second control signal and the third control signal are indicating levels.

Optionally, determining, by the touch chip, whether the fingerprint verification operation is detected, includes:

detecting, by the touch chip, a touch operation of a user on the mobile terminal;

obtaining, a touch parameter of the touch operation;

determining, whether the touch parameter matches a preset touch parameter, and determining, the touch parameter is the fingerprint verification operation in the case that the touch parameter of the touch operation matches the preset touch parameter.

Optionally, the touch parameter comprises one or any combination of following parameters: a touch area, a touch pressure and a touch duration.

The computer readable medium including a permanent medium and a non-permanent medium, a movable medium and a non-movable medium, may store information by any method or technology. The information may be computer-readable instructions, data structures, modules of programs or other data. Examples of the computer storage medium include, but are not limited to, a Phase-change Random Access Memory (PRAM), a Static Random Access Memory (SRAM), a Dynamic Random Access Memory (DRAM), other types of Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical storage, a cassette tape, a tape magnetic disk storage or other magnetic storage device or any other non-transmission medium. The computer storage medium may store information that may be accessed by a computing device. According to a definition in the present disclosure, the computer readable medium does not include a transitory medium, such as a modulated data signal and a carrier.

Those ordinary skilled in the art may realize that, the units and the algorithm steps of the examples in the embodiments of the present disclosure may be implemented in a form of electronic hardware, computer software or combination thereof. Whether the units and the algorithm steps are implemented in a form of hardware or software depends on specific applications and design constraints of the technical solutions. Professional technicians may use different methods to implement the described functions for each particular application, and the implementations should not be considered beyond the scope of the present disclosure.

Those skilled in the art may clearly understand that for the sake of convenience and simplicity of description, the specific working processes of the systems, devices and units described above may refer to corresponding processes in the embodiments of the methods described above, and will not be repeated here.

In embodiments of the present disclosure, it should be understood that the disclosed devices and methods may be implemented in other ways. For example, the device embodiments described above are merely illustrative. For example, the division of the units described above is only a logical functional division. In practice, there may be other ways of division, e.g., multiple units or components may be combined or integrated into another system, or some features may be ignored or not implemented. On another hand, a coupling or a direct coupling or a communication connection shown or discussed may be an indirect coupling or a communication connection through some interfaces, devices or units, and may be electrical, mechanical or other forms.

The unit described as a separation component may or may not be physically separated, and the component displayed as a unit may or may not be a physical unit, that is, it may be located in one place or may be distributed over multiple network units. Some or all of the units may be selected according to actual needs to achieve the purpose of the solution of the embodiment of the present disclosure.

In addition, the functional units in various embodiments of the present disclosure may be integrated in one processing unit, may be physically present separately from each other, or may be integrated in one unit by two or more units.

When the functions are implemented in the form of software function units and sold or used as an independent product, the functions may be stored in a computer-readable storage medium. Based on the understanding, the technical solution of the present disclosure, or a part contributing to a related technology, or a part of the technical solution, may be embodied in a form of a software product in essence. The computer software product is stored in a storage medium, including several instructions to make a computer device (e.g., a personal computer, a server, or a network device, etc.) perform all or part of the steps of the method described in various embodiments of the present disclosure. The aforementioned storage medium includes: a U disk, a mobile hard disk, a ROM, a RAM, a diskette or a disk, and other medium that may store program code.

The scope of the present disclosure is not limited to the specific embodiments of the present disclosure described above. Any technician familiar with the technical field who can easily think of changes or substitutions within the technology scope disclosed in the present disclosure shall be covered by the protection scope of the present disclosure. Therefore, the scope of the present disclosure shall be subject to the scope of the claims.

What is claimed is:

1. An unlocking method, applied to a mobile terminal, wherein a touch chip of the mobile terminal is connected to a central processor of the mobile terminal and a fingerprint driving chip of the mobile terminal, the central processor is connected to the fingerprint driving chip, the method comprises:
   determining, by the touch chip, whether a fingerprint verification operation is detected in a case that the mobile terminal is locked;
   sending, by the touch chip, a first control signal to the fingerprint driving chip and a second control signal to the central processor in a case that the fingerprint verification operation is detected;
   driving, by the fingerprint driving chip, in response to the first control signal, a fingerprint sensor to collect fingerprint information of the fingerprint verification operation, and determining whether the collected fingerprint information matches preset fingerprint information; and
   unlocking the mobile terminal by the central processor in response to the second control signal and a determination result from the fingerprint driving chip in a case that the fingerprint driving chip determines that the collected fingerprint information matches the preset fingerprint information
   wherein determining, by the touch chip, whether the fingerprint verification operation is detected, comprises:
   detecting, by the touch chip, a touch operation of a user on the mobile terminal;
   obtaining a touch parameter of the touch operation;
   determining whether the touch parameter matches a preset touch parameter; and
   determining that the touch operation is the fingerprint verification operation in a case that the touch parameter of the touch operation matches the preset touch parameter.

2. The method according to claim 1, wherein the touch chip is connected to a display module of the mobile terminal, the central processor is connected to the display module, the method further comprises:
   while sending, by the touch chip, the first control signal to the fingerprint driving chip and the second control signal to the central processor,
   sending, by the touch chip, a third control signal to the display module; and
   emitting light by the display module in response to the third control signal, to enable the fingerprint sensor to collect the fingerprint information of the fingerprint verification operation in an illumination environment.

3. The method according to claim 2, wherein the first control signal, the second control signal and the third control signal are indicating levels.

4. The method according to claim 1, wherein the touch parameter comprises one or more of:
   a touch area, a touch pressure and a touch duration.

5. A mobile terminal, comprising a touch chip, a central processor, a fingerprint driving chip, wherein
   the touch chip of the mobile terminal is connected to the central processor of the mobile terminal and the fingerprint driving chip of the mobile terminal, the central processor is connected to the fingerprint driving chip;
   the touch chip is configured to determine whether a fingerprint verification operation is detected in a case that the mobile terminal is locked;
   the touch chip is further configured to send a first control signal to the fingerprint driving chip and a second control signal to the central processor in a case that the fingerprint verification operation is detected;
   the fingerprint driving chip is configured to drive, in response to the first control signal sent by the touch chip, a fingerprint sensor to collect fingerprint information of the fingerprint verification operation, and determine whether the collected fingerprint information matches preset fingerprint information; and
   the central processor is configured to unlock the mobile terminal in response to the second control signal and a determination result from the fingerprint driving chip in a case that the fingerprint driving chip determines that the collected fingerprint information matches the preset fingerprint information;
   wherein the touch chip is configured to:
   detect a touch operation of a user on the mobile terminal;
   obtain a touch parameter of the touch operation detected by the detecting module;
   determine whether the touch parameter obtained by the obtaining module matches a preset touch parameter; and
   determine the touch operation is the fingerprint verification operation in a case that the touch parameter of the touch operation matches the preset touch parameter.

6. The mobile terminal according to claim 5, further comprising: a display module, wherein the touch chip is connected to the display module of the mobile terminal, the central processor is connected to the display module;
   the touch chip is further configured to send a third control signal to the display module; and
   the display module is configured to emit light in response to the third control signal sent by the touch chip, to enable the fingerprint sensor to collect the fingerprint information of the fingerprint verification operation in an illumination environment.

7. The mobile terminal according to claim 6, wherein the first control signal, the second control signal and the third control signal are indicating levels.

8. The mobile terminal according to claim 5, wherein the touch parameter comprises one or more of:
a touch area, a touch pressure and a touch duration.

* * * * *